United States Patent [19]
Hobbs et al.

[11] Patent Number: 5,613,726
[45] Date of Patent: Mar. 25, 1997

[54] LIVESTOCK TRAILER INCLUDING IMPROVED TRAILER SLAT UNIT

[75] Inventors: Kenneth E. Hobbs, Yukon; Kenneth R. Waller, Tuttle; Larry A. O'Pecko, Midwest City; Mike H. Collie, Jr., Norman, all of Okla.

[73] Assignee: 4-Star Trailers, Inc., Oklahoma City, Okla.

[21] Appl. No.: 313,012

[22] Filed: Sep. 27, 1994

[51] Int. Cl.$^6$ .................................................. B62D 25/02
[52] U.S. Cl. ........................ 296/181; 296/29; 296/24.2; 296/191; 105/401; 105/409; 52/630
[58] Field of Search ................... 296/29, 181, 183, 296/191, 203, 204, 24.2, 187, 30; 105/409, 401; 52/630, 588.1; D25/119, 120, 123

[56] References Cited

U.S. PATENT DOCUMENTS

| | | | |
|---|---|---|---|
| D. 216,480 | 1/1970 | Wilson | D25/119 |
| D. 244,382 | 5/1977 | Scheid | D25/73 |
| D. 306,079 | 2/1990 | Whitney | D25/119 |
| 1,913,342 | 6/1933 | Schaffert . | |
| 2,476,451 | 7/1949 | Murphy et al. | 52/588.1 X |
| 2,746,789 | 5/1956 | Ridgway | 52/630 X |
| 2,993,728 | 7/1961 | Boran et al. | 296/181 |
| 3,043,407 | 7/1962 | Marryatt . | |
| 3,097,877 | 7/1963 | Erlandsen | 296/181 |
| 3,100,556 | 8/1963 | Ridder | 52/588.1 |
| 3,269,072 | 8/1966 | Black | 52/377 |
| 3,380,216 | 4/1968 | Spence | 52/595 |
| 3,555,762 | 1/1971 | Costanzo, Jr. | 52/588.1 |
| 4,758,128 | 7/1988 | Law | 414/477 |
| 4,951,992 | 8/1990 | Hockney | 296/204 |
| 5,052,741 | 10/1991 | Brown et al. | 296/191 |
| 5,131,710 | 7/1992 | Kamiguchi et al. | 296/76 |

FOREIGN PATENT DOCUMENTS

| | | | |
|---|---|---|---|
| 1680618 | 3/1970 | Germany | 296/183 |
| 2918582 | 11/1980 | Germany | 296/183 |
| 392284 | 9/1965 | Switzerland | 296/181 |
| 1171253 | 11/1969 | United Kingdom | 296/183 |

OTHER PUBLICATIONS

Commercial Car Journal, Feb. 1960, p. 136, copy in call 296 subclass 24.2.

*Primary Examiner*—Dennis H. Pedder
*Attorney, Agent, or Firm*—Dougherty, Hessin, Beavers & Gilbert

[57] ABSTRACT

An extruded, one-piece metal slat unit for attachment to a frame member of a trailer. The slat unit includes an elongated body portion having at least one leg member connected to and longitudinally extending along the interior surface of the body portion between the ends thereof. The leg member includes a foot portion suitable for welding to the frame member. The foot portion is spaced from the interior surface of the body portion such that an open space is provided therebetween. The open space dissipates heat generated during the welding process thereby preventing nonaesthetic weld and heat track marks from appearing on the exterior surface of the slat unit and hence the trailer. A livestock trailer including the slat unit is also provided.

27 Claims, 6 Drawing Sheets

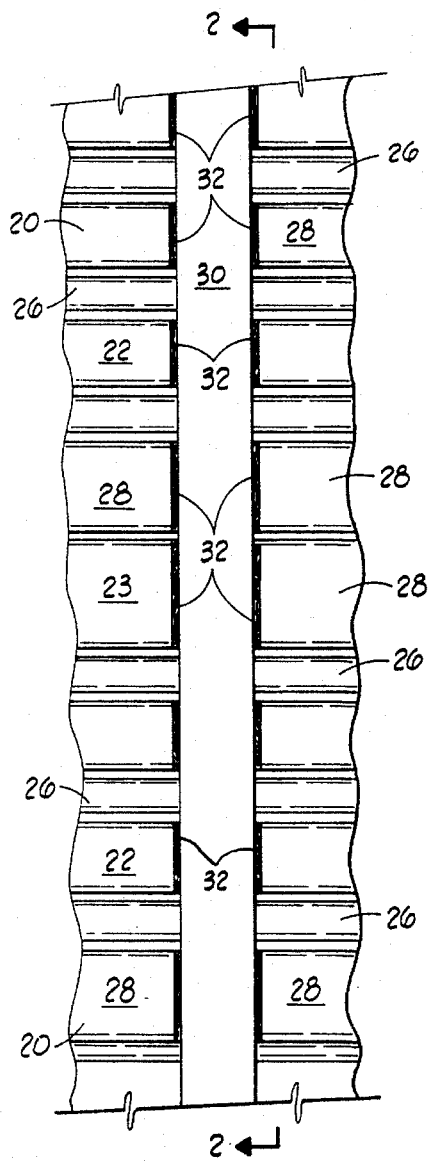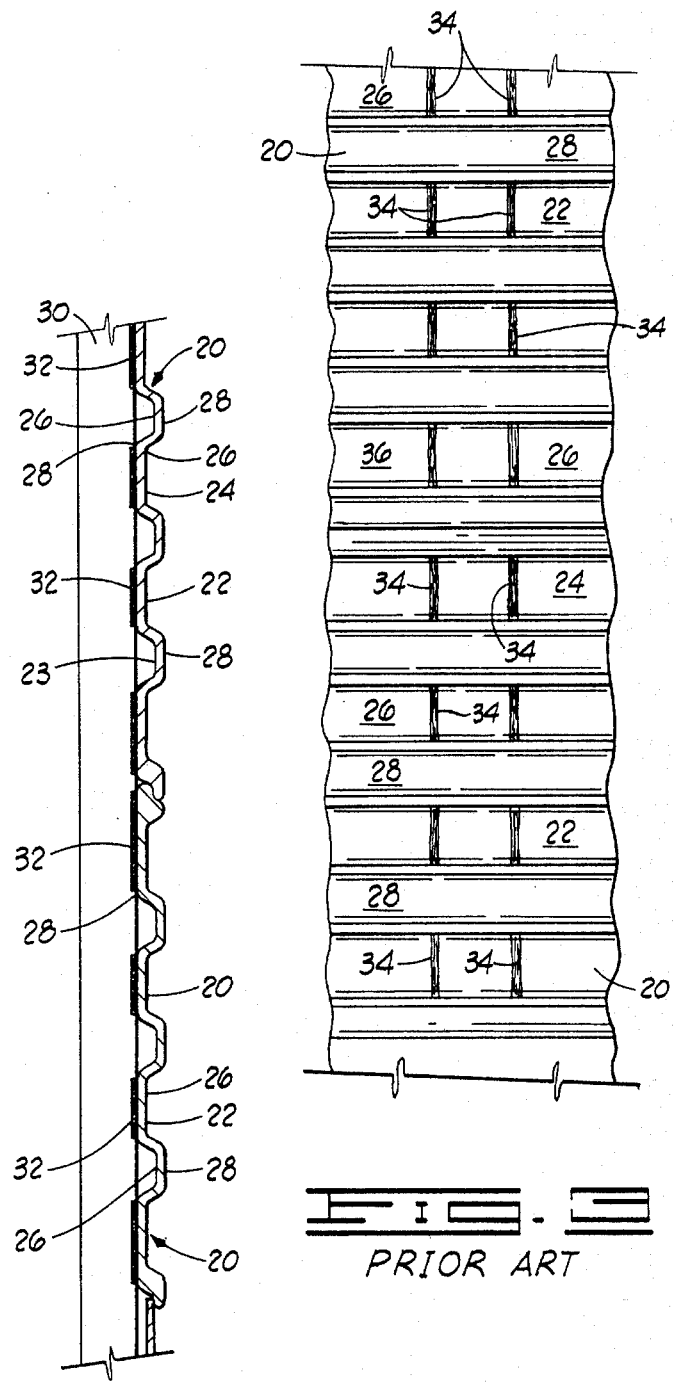
FIG. 1 PRIOR ART
FIG. 2 PRIOR ART
FIG. 3 PRIOR ART

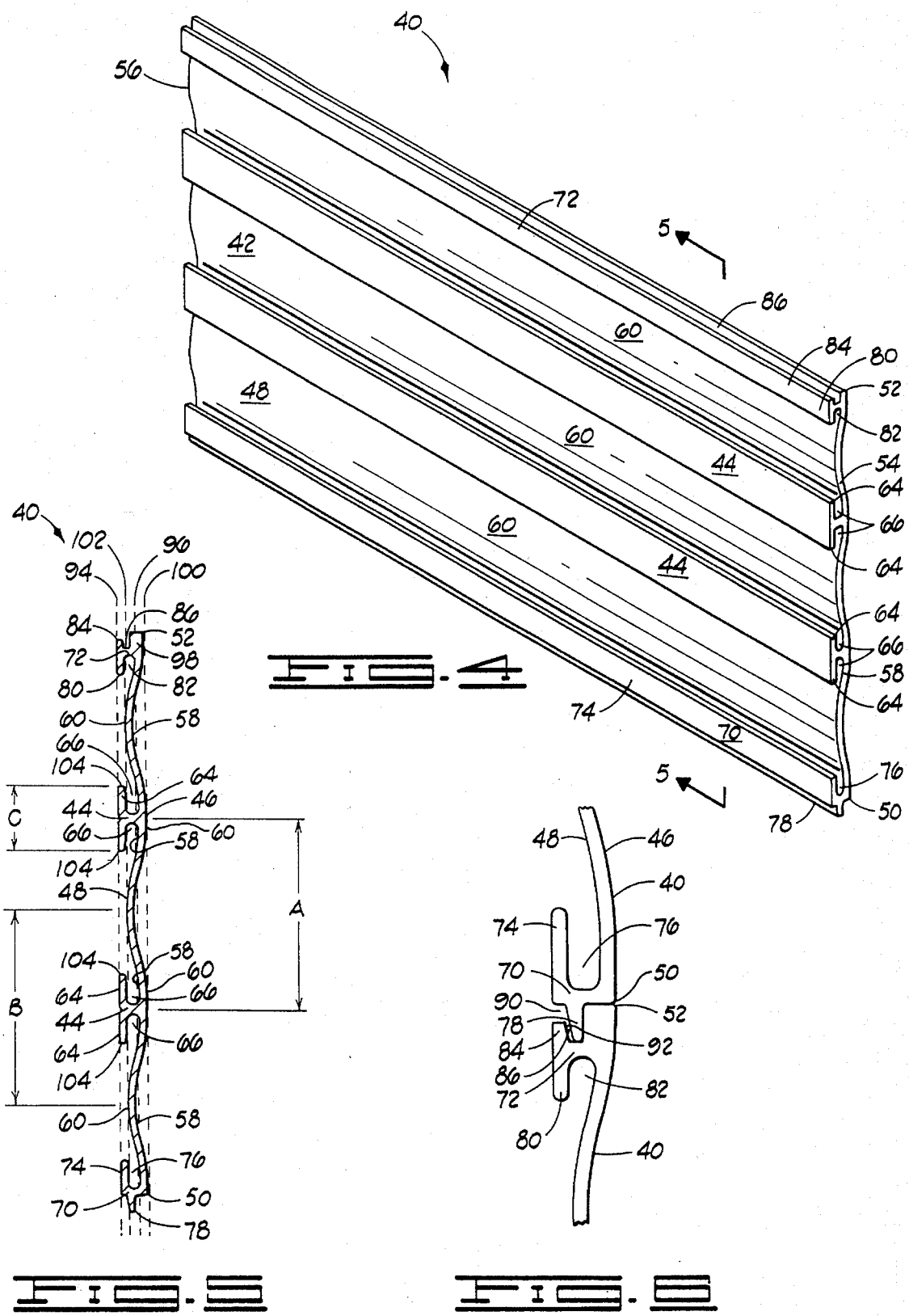

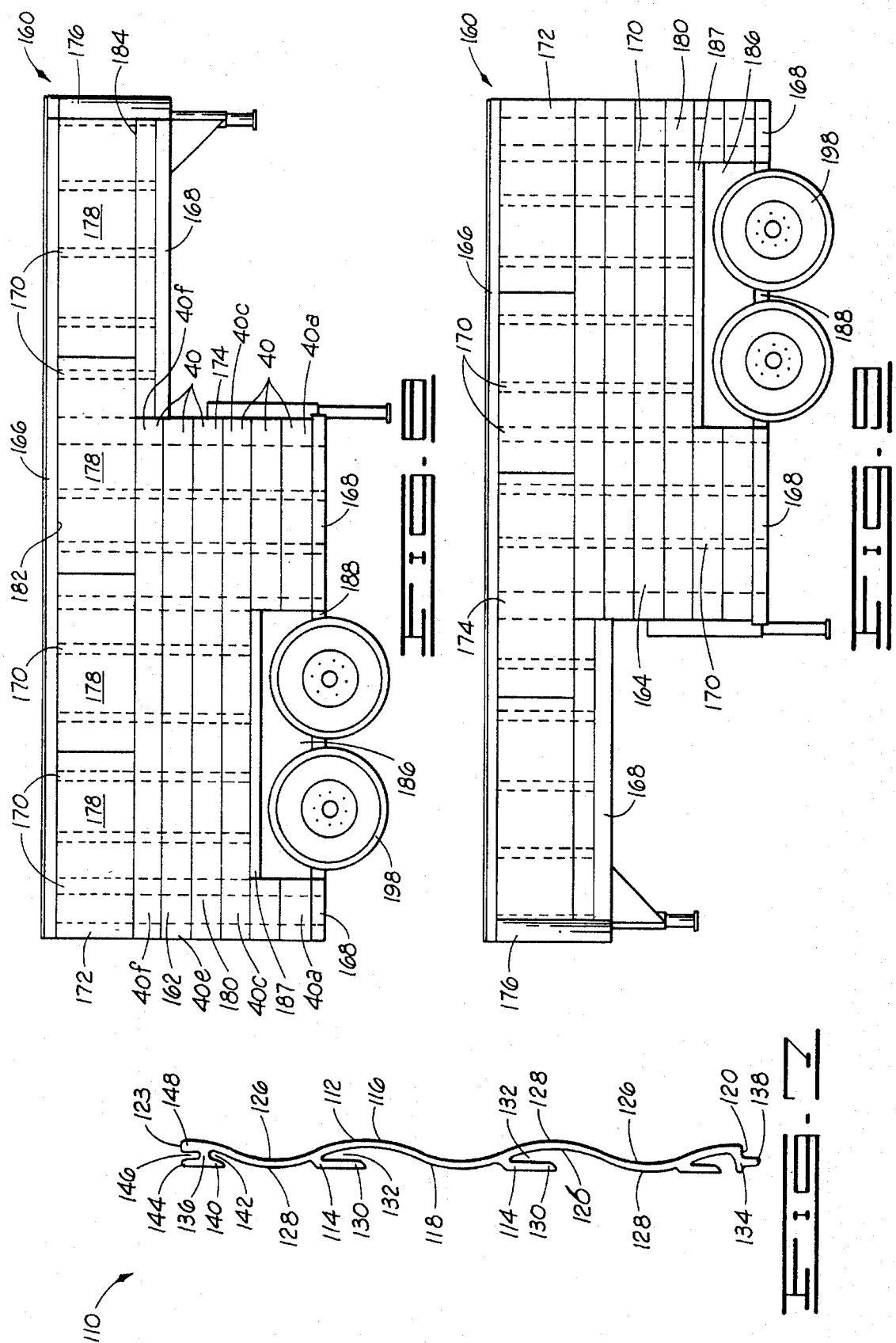

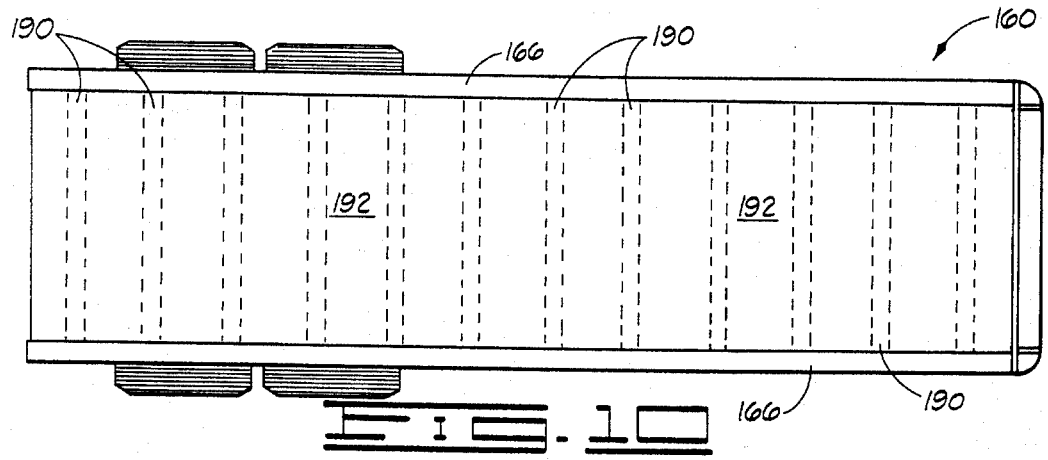
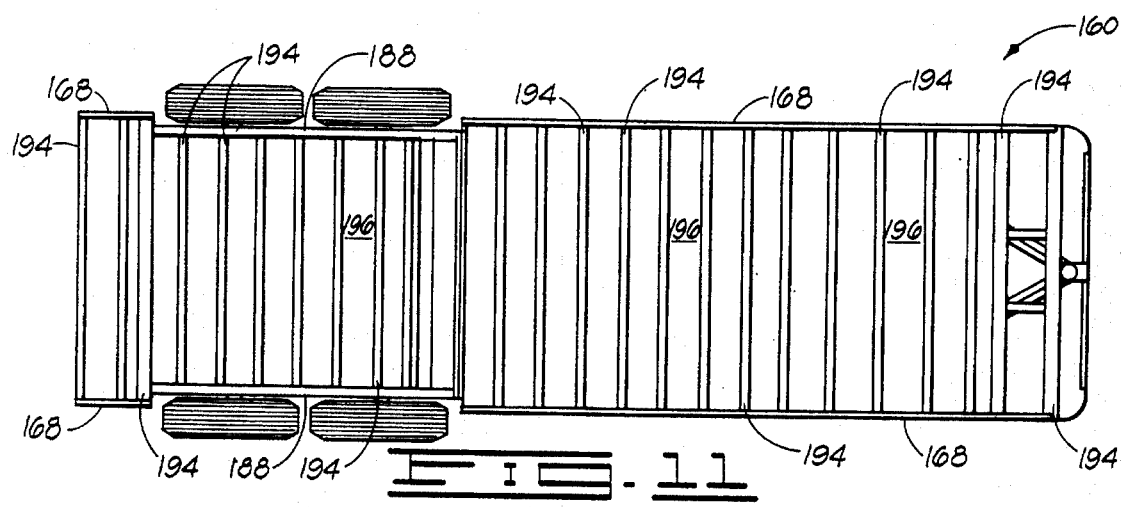
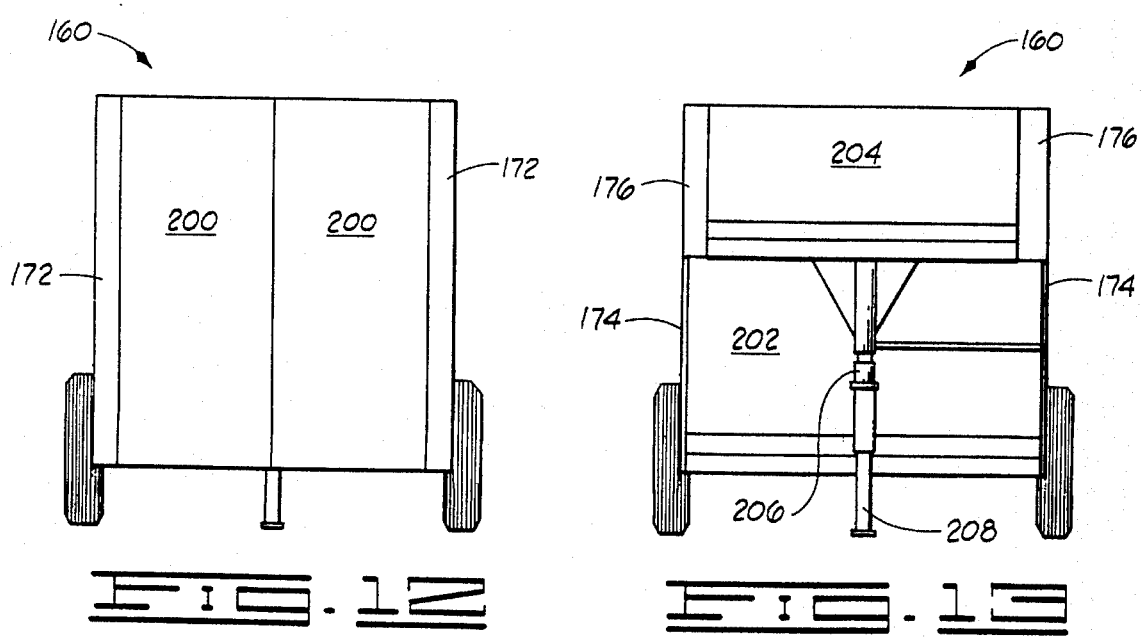

LIVESTOCK TRAILER INCLUDING IMPROVED TRAILER SLAT UNIT

BACKGROUND OF THE INVENTION

1. Field of the Invention

This invention relates generally to livestock trailers (e.g., horse and cattle trailers), and more particularly, but not by way of limitation, to welded metal livestock trailers which include side walls formed of extruded metal slat units.

2. Background of the Invention

Horses, cattle and other livestock are commonly transported from one location to another in specially constructed trailers which include side walls, roofs, loading gates or doors and coupler assemblies. The dimensions and features of such trailers vary widely depending upon the type of livestock involved and the specific end-uses for which the traillers are designed. For example, horse trailers range from single-horse, standard hitch trailers to multi-horse, gooseneck hitch trailers that include living quarters for the horse attendant(s).

The side walls of many livestock trailers are formed using sections or slats ("slat units") that have been extruded as a one-piece unit out of metal (e.g., an aluminum alloy). The advantages of using extruded metal slat units to form the side walls of a livestock trailer are numerous. For example, slat units formed of a metal such as an aluminum alloy are strong enough to support the livestock yet relatively lightweight which enhances the mobility of the trailer. Aluminum alloys that have good strength, corrosion resistance and machinability are readily available. The extrusion process is relatively inexpensive and allows slat units to be formed in a variety of shapes and sizes. The slat units are durable and have good welding characteristics. The slat units are directly welded to the side posts of the trailer from the inside of the trailer thereby allowing the side walls of the trailer to be easily and readily assembled. The slat units are typically corrugated to provide maximum strength thereto.

Unfortunately, although the ability of the slat units to be welded directly to the side posts of the trailer is an important advantage, the welding process creates heat tracks or weld marks ("weld marks") that show up on the exterior surfaces of the slat units and hence the outside of the trailer. The nonaesthetic nature of the weld marks decreases the value of the trailer in many respects. There is a need for a way to prevent the weld marks from showing up on the exterior surfaces of the slat units.

SUMMARY OF THE INVENTION

In accordance with the present invention, a new slat unit has been developed that has a structure such that weld marks do not show up on the exterior surface of the unit when the unit is welded to a side post or other frame member of a trailer.

In one aspect, the invention is a slat unit for attachment to a frame member of a trailer. The slat unit comprises an elongated body portion and at least one leg member. The elongated body portion has an exterior surface, an interior surface, a first edge, a second edge, a first end and a second end. The leg member is connected to and longitudinally extends along the interior surface of the body portion between the first and second ends thereof, and is positioned on the interior surface between the first and second edges of the body portion. The leg member has a foot portion for attachment to the frame member, the foot portion being spaced from the interior surface of the body portion Such that an open space is provided therebetween for dissipating heat generated from attaching the foot portion to the frame member.

In one embodiment, the leg member of the inventive slat unit has a pair of foot portions extending in opposite directions for attachment to the frame member. Each of the foot portions is spaced from the interior surface of the body portion such that an open space is provided between the foot portion and the interior surface for dissipating heat generated from attaching the foot portion to the frame member. In another embodiment, the leg member has a single foot portion that is actually a direct extension of the leg member.

The slat unit may optionally include a first edge leg member and a second edge leg member that function both to attach the slat unit to the frame member and to connect the edges of the slat unit to the edges of adjacent slat units. The first edge leg member is connected to and longitudinally extends along the interior surface of the body portion between the first and second ends thereof, and is positioned on the interior surface of the body portion adjacent the first edge of the body portion. The first edge leg member includes:

(a) a first edge foot portion extending toward the second edge of the body portion for attachment to the frame member, the first edge foot portion being spaced from the interior surface of the body portion such that an open space is provided therebetween for dissipating heat generated from attaching the first edge foot portion to the frame member; and (b) a tongue extending away from the first and second edges of the body portion.

The second edge leg member is connected to and longitudinally extends along the interior surface of the body portion between the first and second ends of the body portion, and is positioned on the interior surface of the body portion adjacent the second edge of the body portion. The second edge leg member includes:

(a) a second edge foot portion extending toward the first edge of the body portion for attachment to the frame member, the second edge foot portion being spaced from the interior surface of the body portion such that an open space is provided therebetween for dissipating heat generated from attaching the second edge foot portion to the frame member; and (b) a heel portion extending in an opposite direction from the second edge foot portion, the heel portion being spaced from the interior surface of the body portion such that a groove is provided therebetween.

The tongue of the first edge leg member of one slat unit is received by the groove of the second edge leg member of an adjacent slat unit to interlock the two units together.

The inventive slat unit can be conveniently extruded as a one-piece unit out of a metal such as an aluminum alloy, and can be corrugated, i.e., the slat unit can be formed such that the interior surface and the exterior surface of the body portion each have a series of alternating longitudinally extending furrows and longitudinally extending ridges therein. The corrugated structure enhances the strength of the slat unit.

In another aspect, the invention is a trailer including a first side assembly, a second side assembly, at least one cross member connecting the first side assembly and the second side assembly together, a wheel assembly connected to at least one of the first side assembly, the second side assembly and the cross member, and coupler means connected to at least one of the first side assembly, the second side assembly and the cross member for attaching the trailer to a vehicle. The first and second side assemblies each include a first side post, a second side post and at least one slat unit interconnecting the first and second side posts and forming a side wall of the trailer. The slat units of the first and second side assemblies each include an elongated body portion and at least one leg member. The elongated body portion has an exterior surface, an interior surface, a first edge, a second edge, a first end and a second end. The leg member is connected to and longitudinally extends along the interior surface of the body portion between the first and second ends thereof, and is positioned on the interior surface of the body portion between the first and second edges thereof. The leg member has a foot portion welded or otherwise attached to the first and second side posts of one of the first and second side assemblies. The foot portion is spaced from the interior surface of the body portion such that an open space is provided therebetween for dissipating heat generated from welding or otherwise attaching the foot portion to the side posts.

It is, therefore, an object of the present invention to provide a slat unit that can be directly welded or otherwise attached to a side post or other frame member of a livestock trailer without creating nonaesthetic weld marks that show up on the exterior surface of the slat unit and hence the outside of the trailer.

It is also an object of the present invention to provide such a slat unit that can be easily extruded as a one-piece unit out of a metal such as an aluminum alloy.

It is also an object of the present invention to provide such a slat unit that can be easily extruded into a variety of shapes and sizes and corrugated in various ways to add maximum strength thereto.

It is also an object of the present invention to provide a livestock trailer that includes the inventive slat unit.

Additional objects, features and advantages of the present invention will be readily apparent to those skilled in the art upon a reading of the detailed description of the preferred embodiments of the invention which follows when taker in conjunction with the accompanying drawings.

BRIEF DESCRIPTION OF THE DRAWINGS

FIG. 1 is an enlarged side elevational view from the inside of a trailer showing interior surfaces of conventional (prior art) slat units as attached to a side post of the trailer.

FIG. 2 is a sectional view taken along line 2—2 of FIG. 1.

FIG. 3 is an enlarged side elevational view from the outside of a trailer showing exterior surfaces of conventional (prior art) slat units as attached to a side post of the trailer.

FIG. 4 is an enlarged perspective view of a preferred embodiment of the inventive slat unit.

FIG. 5 is a sectional view taken along line 5—5 of FIG. 4.

FIG. 6 is a super enlarged sectional view showing the interconnection between the edges of two inventive slat units (the embodiment shown by FIGS. 4 and 5).

FIG. 7 is a sectional view similar to FIG. 5 but showing an alternative embodiment of the inventive slat unit.

FIG. 8 is a side plan view of the inventive trailer.

FIG. 9 is a side plan view of the inventive trailer showing a side opposite the side shown by FIG. 8.

FIG. 10 is a top plan view of the inventive trailer.

FIG. 11 is a bottom plan view of the inventive trailer.

FIG. 12 is a rear view of the inventive trailer.

FIG. 13 is a front view of the inventive trailer.

DETAILED DESCRIPTION OF PRIOR ART SLAT UNITS

Figures 14, 15, 17:
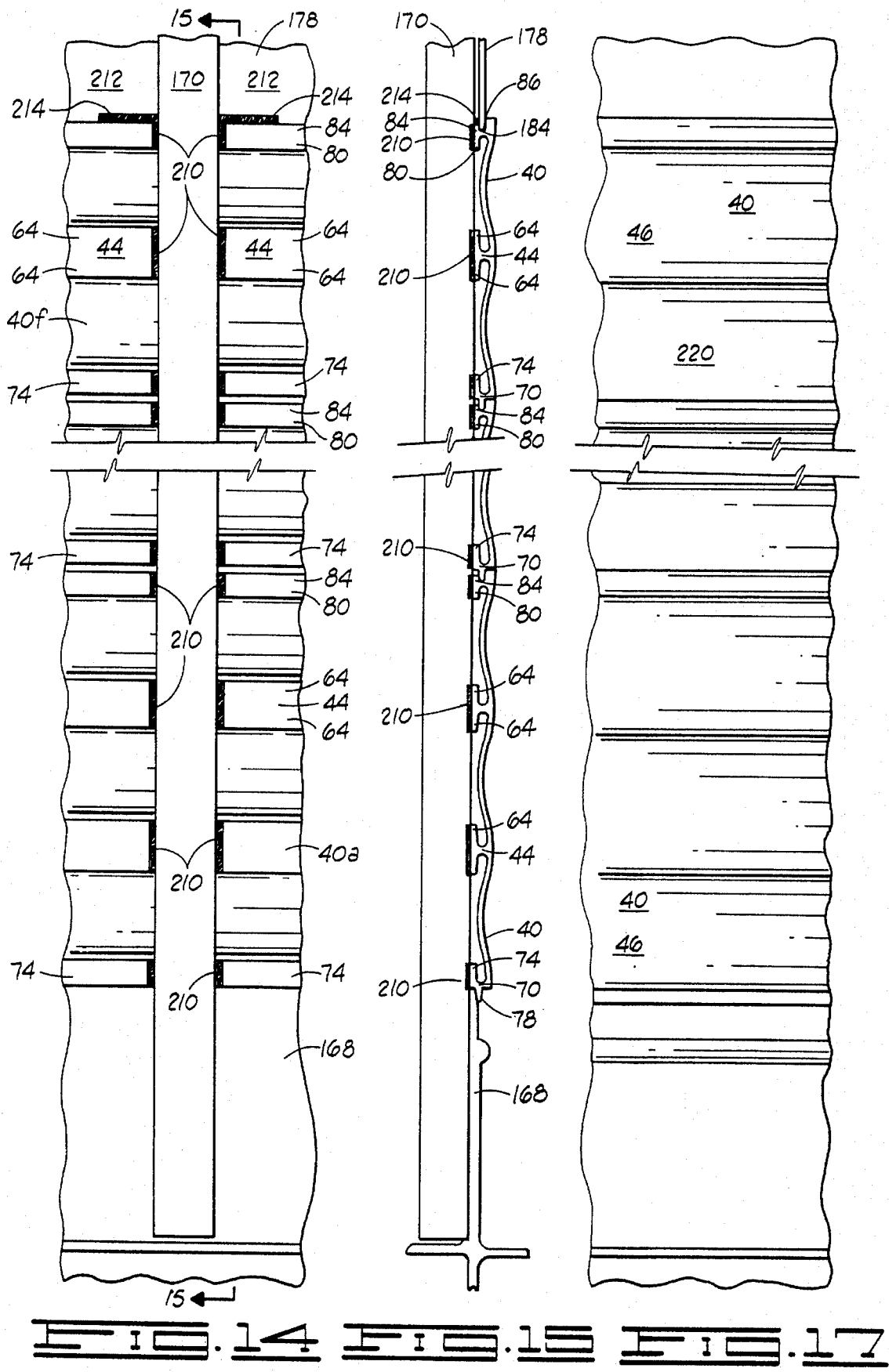
FIG. 14 is an enlarged side elevational view from the inside of the inventive trailer showing interior surfaces of inventive slat units (the embodiment shown by FIGS 4 and 5) as attached to a side post and other structure of the trailer.
FIG. 15 is a sectional view taken along line 15—15 of FIG. 14.
FIG. 17 is an enlarged side elevational view from the outside of the inventive trailer showing exterior surfaces of inventive slat units (the embodiment shown by FIGS 4 and 5) as attached to side posts of the trailer and showing an exterior surface of the trailer.

FIGS. 1–3 of the drawings show conventional (prior art) extruded aluminum alloy slat units attached to a side post of a trailer and illustrate the problem associated therewith. As shown, the conventional slat units 20 each include an elongated body portion 22 having an interior surface 23 and an exterior surface 24. The interior and exterior surfaces 23 and 24 each include a series of alternating longitudinally extending grooves 26 and longitudinally extending ridges 28 therein. The flat ridges 28 on the interior surface 23 of each slat unit are welded to a side post 30 of a trailer at points 32 thereon. As shown by FIG. 3, the welding process creates weld and heat distortion marks 34 that show up on the exterior surfaces 24 of the slat units 20 and hence the outside surface 36 of the trailer.

DETAILED DESCRIPTION OF PREFERRED EMBODIMENTS OF THE INVENTION

Although the inventive slat unit is particularly suitable for use in forming the front to rear side walls of a livestock trailer, it can be used to form other parts (e.g., the front side wall, rear side wall and top wall) of the trailer and can be used in association with trailers other than livestock trailers as well. The inventive slat unit is most suitable for use in association with welded metal livestock trailers in Which corrugated, extruded metal slat units are employed.

Referring now to FIGS. 4–6, the most preferred embodiment of the inventive slat unit is illustrated and generally designated by the numeral 40. The slat unit 40 comprises an elongated, corrugated body portion 42 and at least one middle leg member 44. The slat unit 40 is designed to be attached (welded) directly to one or more side posts or other frame members of a trailer. As used herein and in the appended claims, a frame member means a side post, cross member, top rail, bottom rail or other structural member of the trailer to which the shell or body of the trailer is attached. A side post means an intermediate side post, corner side post or other upright structural member of the trailer to which the shell or body of the trailer is attached.

The body portion 42 of the slat unit 40 includes an exterior surface 46, an interior surface 48, a first or bottom edge 50, a second or top edge 52, a first or rear end 54 and a second or front end 56. The body portion 42 is corrugated such that the exterior surface 46 and the interior surface 48 each include a series of alternating longitudinally extending indentations or furrows 58 and longitudinally extending ridges 60 therein (the furrow 58 of one surface is the ridge 60 of the other surface and vice versa). As shown, the furrows 58 are preferably concave (curved) in shape and the ridges 60 are preferably convex (curved) in shape. The concave/convex (curved) structure allows the leg members to be effectively incorporated into the overall structure of the inventive slat unit. Such a structure is also advantageous in that it increases the structural integrity of the slat unit and enhances the aerodynamics and appearance of the trailer.

Although the slat unit 40 preferably includes either one or two middle leg members 44, additional leg members can be included if desired. Each middle leg member 44 is connected to and longitudinally extends along the interior surface 48 of the body portion 42 from the first end 54 to the second end 56 thereof, and is positioned on the interior surface of the body portion between the first edge 50 and second edge 52 of the body portion. Each middle leg member 44 has a pair of foot portions 64 extending in opposite directions from each other for attachment (welding) to the side post(s) or other frame member(s) of the trailer. Each of the foot portions 64 is spaced from the interior surface 48 of the body portion 42 such that an open space 66 is provided between the foot portion and a furrow 58 in the interior surface of the body portion for dissipating heat generated from attaching the foot portion to the side post(s) or other frame member(s) of the trailer. Although each foot portion 64 can be spaced from the interior surface 48 of the body portion 42 such that the open space 66 is provided between the foot portion and a ridge 60 in the interior surface, spacing each foot portion from the interior surface such that the space 66 is provided between the foot portion and a furrow 58 in the interior surface provides the maximum heat dissipation space when the body portion 42 is as close to the side post(s) or other frame member(s) of the trailer as possible.

The slat unit 40 further includes a first edge leg member 70 and a second edge leg member 72 which function to further attach the slat unit to the side post(s) or other frame member(s) of the trailer and also to connect the edges of the slat unit to the edges of adjacent slat units.

The first edge leg member 70 is connected to and longitudinally extends along the interior surface 48 of the body portion 42 from the first or rear end 54 to the second or front end 56 thereof, and is positioned on the interior surface of the body portion adjacent the first or bottom edge 50 thereof. The first edge leg member 70 includes a first edge foot portion 74 extending toward the second or top edge 52 of the body portion 42 for attachment to the side post(s) or other frame member(s) of the trailer. The first edge foot portion 74 is spaced from the interior surface 48 of the body portion 42 such that an open space 76 is provided between the first edge foot portion and the interior surface for dissipating heat generated from attaching the first edge foot portion to the side post(s) or other frame member(s) of the trailer. The first edge leg member 70 also includes a tongue 78 extending away from the first and second edges 50 and 52 of the body portion 42.

The second edge leg member 72 is connected to and longitudinally extends along the interior surface 48 of the body portion 42 from the first or rear end 54 to the second or front end 56 thereof and is positioned on the interior surface of the body portion adjacent the second or top edge 52 of the body portion. The second edge leg member 72 includes a second edge foot portion 80 that extends toward the first or bottom edge 50 of the body portion 42 for attachment to the side post(s) or other frame member(s) of the trailer. The second edge foot portion 80 is spaced from the interior surface 48 of the body portion 42 such that an open space 82 is provided between the second edge foot portion and the interior surface of the body portion for dissipating heat generated from attaching the second edge foot portion to the side post(s) or other frame member(s) of the trailer. The second edge leg member 72 also includes a heel portion 84 extending in an opposite direction from the second edge foot portion 80 away from the first edge foot of the body portion 42. The heel portion 84 is spaced from the interior surface 48 of the body portion 42 such that a groove 86 is provided between the heel portion and the interior surface of the body portion. The heel portion 84 is also suitable for attachment to the side post(s) or other frame member(s) of the trailer. The groove 86 and any structure received thereby dissipate heat generated from attaching the heel portion 84 to the side post(s) or other frame member(s) of the trailer.

The first edge foot portion 74 is spaced from the interior surface 48 of the body portion 42 such that the open space 76 is provided between the first edge foot portion and a furrow 58 in the interior surface of the body portion. Similarly, the second edge foot portion 80 is spaced from the interior surface 48 of the body portion 42 such that the open space 82 is provided between the second edge foot portion and a furrow 58 in the interior surface of the body portion. As discussed above in connection with the foot portions 64, spacing the first edge foot portion 74 and second edge foot portion 80 from the interior surface 48 such that the corresponding spaces 76 and 82 are provided between the foot portion and a furrow 58 in the interior surface provides the maximum heat dissipation space with the body portion 42 as close to the side post(s) or other frame member(s) of the trailer as possible.

As shown by FIG. 6, the tongue 78 of the first edge leg member 70 of one slat unit 40 fits in the groove 86 of the second edge leg member 72 of an adjacent slat unit 40 to interlock the two slat units together. The tongue 78 fits within the groove 86 such that a space 90 is provided between the firsts edge foot portion 74 of the first edge leg member 70 of the one slat unit and the heel portion 84 of the second edge leg member 72 of the other slat unit. The tongue 78 also fits within the groove 86 such that a space 92 is provided therebetween. As explained further below, the space 90 and space 92 provide areas that allow the two slat units to be effectively welded together.

The slat unit 40 is a one piece unit, i.e., the body portion 42, each middle leg member 44 (including the foot portions 64), first edge leg member 70 (including the first edge foot portion 74 and tongue 78) and second edge leg member 72 (including the second foot portion 80 and heel portion 84) are integrally formed together. The slat unit 40 is preferably extruded out of an aluminum alloy. The aluminum alloy preferably comprises in the range of from 93.35% to 96.18% by weight aluminum, 0.35% to 1.4% by weight silicon, 0.5% to 1.2% by weight magnesium, 0.09% to 0.25% by weight chromium and 0.28% to 1.0% by weight copper, each weight percent being based on the total weight of the alloy. Slats extruded using such alloys are lightweight yet strong enough to support the livestock in the trailer. Such alloys have excellent strength, corrosion resistance and welding characteristics and are very suitable for extrusion.

As illustrated by FIG. 5, the distance between a line extending along the outermost portions of the ridges 60 in the exterior surface 46 of the body portion 42 (imaginary line 100) and a line extending along the outermost portions of the ridges 60 in the interior surface 48 of the body portion (imaginary line 102) is preferably in the range of from about 0.272 inches to about 0.460 inches. The foot portions 64, first edge foot portion 74, second edge foot portion 80 and heel portion 84 all extend along a line (imaginary line 94) that is substantially parallel to the lateral center line of the body portion 42, i.e., the line (imaginary line 96) centered between the line 100 and the line 102. The overall thickness of the slat unit 40, i.e., the distance between the line 100 and the line 94, is preferably in the range of from about 0.375 inches to about 0.563 inches. A portion 98 of the body portion 42 adjacent the second or top edge 52 thereof is thicker than the remaining portions of the body portion. The distance between the center of one ridge 60 to the center of an adjacent ridge 60 throughout the body portion 42, as represented in FIG. 5 by the letter "A", is preferably in the range of from about 2.000 inches to about 3.500 inches. Similarly, the distance between the center of one furrow 58 to the center of an adjacent furrow 58 throughout the body portion 52 as represented in FIG. 5 by the letter "B", is preferably in the range of from about 2.00 to about 3.50 inches. The distance between the outer ends 104 of the foot portions 64 corresponding to each middle leg member 44, as represented in FIG. 5 by the letter "C", is preferably in the range of from about 0.995 inches to about 1.500 inches. The distance between each foot portion (the foot portions 64, the first edge foot portion 74 and the second edge foot portion 80) and the interior surface 48 of the body portion 42, i.e., the width of the open spaces 66, 76 and 82, is preferably in the range of from about 0.205 to about 0.362 inches. The length and height of the slat unit 40 will vary depending upon where the slat unit is placed on the trailer and the overall dimensions of the trailer.

An alternative embodiment of the inventive slat unit is illustrated by FIG. 7 and generally designated by the reference numeral 110. The slat unit 110 includes an elongated, corrugated body portion 112 and a plurality of middle leg members 114. Like the slat unit 40, the slat unit 110 is designed to be attached (welded) directly to one or more side posts or other frame members of a trailer.

The body portion 112 includes an exterior surface 116, an interior surface 118, a first or bottom edge 120, a second or top edge 123, a first or rear end (not shown) and a second or front end (not shown). The body portion 112 is corrugated such that the exterior and interior surfaces 116 and 118 each include a series of alternating longitudinally extending indentations or furrows 126 and longitudinally extending ridges 128 therein (the furrow 126 of one surface is the ridge 128 of the other surface and vice versa). The furrows 126 are preferably concave (curved) in shape and the ridges 128 are preferably convex (curved) in shape. The concave/convex (curved) structure is advantageous for generally the same reasons set out above in connection with the concave/convex structure of the slat unit 40.

Each middle leg member 114 is connected to and longitudinally extends along the interior surface 118 of the body portion 112 from the first end to the second end thereof, and is positioned on the interior surface between the first edge 120 and second edge 123 of the body portion. Each middle leg member 114 has a single foot portion 130 for attachment (welding) to the side post(s) or other frame member(s) of the trailer. Each foot portion 130 is actually a direct extension of the corresponding middle leg member 114. Each foot portion 130 is spaced from the interior surface 118 of the body portion 112 such that an open space 132 is provided between the foot portion and a furrow 126 in the interior surface of the body portion for dissipating heat generated from attaching the foot portion to the side post(s) or other frame member(s) of the trailer. As in the most preferred embodiment of the inventive slat unit, spacing each foot portion 130 from the interior surface 118 of the body portion 112 such that the space 132 is provided between the foot portion and a furrow 126 in the interior surface provides the maximum heat dissipation space when the body portion is as close to the side post(s) or other frame member(s) of the trailer as possible.

The slat unit 110 further includes a first edge leg member 134 and a second edge leg member 136.

The first edge leg member 134 is connected to and longitudinally extends along the interior surface 118 of the body portion 112 from the first or rear end to the second or front end thereof, and is positioned on the interior surface of the body portion adjacent the first or bottom edge 120 thereof. The first edge leg member 134 includes a tongue 138 extending away from the first and second edges 120 and 123 of the body portion 112.

The second edge leg member 136 is connected to and longitudinally extends along the interior surface 118 of the body portion 112 from the first end to the second end thereof, and is positioned on the interior surface of the body portion adjacent the second or top edge 123 of the body portion. The second edge leg member 136 includes a second edge foot portion 140 that extends toward the first or bottom edge 120 of the body portion 112 for attachment to the side post(s) or other frame member(s) of the trailer. The second edge foot portion 140 is spaced from the interior surface 118 of the body portion 112 such that an open space 142 is provided between the second edge foot portion and the interior surface of the body portion for dissipating heat generated from attaching the second edge foot portion to the side post(s) or other frame member(s) of the trailer. In order to provide the maximum heat dissipation space with the body portion 112 as close to the side post(s) or other frame member(s) of the trailer as possible, the second edge foot portion 140 is spaced from the interior surface 118 of the body portion 112 such that the open space 142 is provided between the second edge foot portion 140 and a furrow 126 in the interior surface of the body portion.

The second edge leg member 136 also includes a heel portion 144 extending in an opposite direction from the second edge foot portion 140 away from the first edge 120 Of the body portion 112. The heel portion 144 is spaced from the interior surface 118 of the body portion 112 such that a groove 146 is provided between the heel portion and the interior surface of the body portion. The heel portion 144 is also suitable for attachment to the side post(s) or other frame member(s) of the trailer. The groove 146 and any structure received thereby dissipate heat generated from attaching the heel portion 144 to the side post(s) or other frame member(s) of the trailer.

Like the first edge leg member 70 and second edge leg member 72 of the slat unit 40, the first edge leg member 134 and second edge leg member 136 function to connect the edges of the slat unit 110 to the edges of adjacent slat units 110. The tongue 138 of one slat unit 110 fits in the groove 146 of an adjacent slat unit 110 to interlock the two slat units together.

The distance between each foot portion (the foot portions 130 and the second edge foot portion 140) and the interior surface 118 of the body portion 112 of the slat unit 110, i.e., the width of the open spaces 132 and 142, is preferably in the range of from about 0.090 inches to about 0.367 inches. The foot portions 130, second edge foot portion 140 and heel portion 144 all extend along a line that is substantially parallel to the lateral center line of the body portion 112, i.e., the line centered between the line extending along the outermost portions of the ridges 128 in the exterior surface 116 of the body portion 112 and the line extending along the outermost portions of the ridges 128 in the interior surface 118 of the body portion. The overall thickness of the slat unit 110 is preferably in the range of from about 0.375 inches to about 0.563 inches. A portion 148 of the body portion 112 adjacent the second or top edge 123 thereof is thicker than the remaining portions of the body portion. The distance between a line extending along the outermost portions of the ridges 128 in the exterior surface 116 of the body portion 112 and a line extending along the outermost portions of the ridges 128 in the interior surface 118 of the body portion is preferably in the range of from about 0.272 inches to about 0.460 inches. The distance between the center of one ridge 128 to the center of an adjacent ridge 128 throughout the body portion and the distance between the center of one furrow 126 to the center of an adjacent furrow 126 throughout the body portion are each in the range of from about 2.000 inches to about 3.500 inches. Each middle leg member 114, including the corresponding foot portion 130, has a total length of in the range of from about 0.995 to about 1.500 inches. The length and height of the slat unit 110 will vary depending upon where the slat unit is placed on the trailer and the overall dimensions of the trailer.

The remaining aspects of the slat unit 110 correspond to the slat unit 40. For example, the slat unit 110 is extruded as a one-piece unit out of an aluminum alloy.

Referring now to FIGS. 8–13, the livestock trailer of the present invention is illustrated and generally designated by the numeral 160. The trailer 160 includes a first side assembly 162 and a second side assembly 164. The side assemblies 162 and 164 each include a top rail unit 166 and a bottom rail unit 168. The top rail unit 166 and bottom rail unit 168 are connected together by a plurality of intermediate side posts 170, rear corner side post 172, drop side post 174 and nose corner side post 176.

The side assemblies 162 and 164 also each include a plurality of inventive slat units 40 and a plurality of smooth skin units 178 which form a side wall 180 of the trailer 160. Each smooth skin unit 178 has a top edge 182 and a bottom edge 184. The side assemblies 162 and 164 also each include a wheel well 186, each wheel well 186 including a wheel well post 187. Each wheel well 186 is attached to a subframe 188. The slat units 40 are each welded to the corresponding rear corner Side post 172, at least one corresponding intermediate side post 170 and/or the corresponding drop side post 174. The smooth skin units 178 are each attached (e.g., riveted, welded or bonded) to the corresponding rear corner side post 172, at least one corresponding intermediate side post 170, the corresponding drop side post 174 and/or the corresponding nose corner side post 176. Attachment of the slat units 40 to the trailer and to each other is further described below.

As best shown by FIG. 10, a plurality of upper cross members 190 connect the top rail units 166 of the side assemblies 162 and 164 together. A roof unit 192 is attached to the upper cross members 190. As best shown by FIG. 11, an underlying frame connects the first side assembly 162 and second side assembly 164 together. The underlying frame includes a plurality of lower cross members 194 which connect the bottom rail units 168 of the side assemblies 162 and 164 and the subframes 188 together. A floor unit 196 is attached to the lower cross members 194. A wheel assembly 198 (including a suspension, axles, wheels, tires, etc.) is connected to the subframes 188 and one or more of the lower cross members 194. As best shown by FIG. 12, a rear door 200 is pivotally attached to the rear corner side post 172 of each of the first and second side assemblies 162 and 164. As best shown by FIG. 13, a front panel 202 interconnects the drop side posts 174 and a nose panel 204 interconnects the nose corner side posts 176 of the first and second side assemblies 162 and 164. A coupler unit 206 is attached to one or more of the lower cross members 194. The coupler unit 206 attaches to a corresponding hitch assembly of a truck or other vehicle. A drop stand 208 is attached to the front panel 202.

The specific dimensions and features of the inventive trailer will vary depending upon the type of livestock involved and the end uses for which the trailer is designed. For example, the side assemblies 162 and 164 can each include one or more windows and/or doors. The embodiment illustrated by FIGS. 8–13 of the drawings is a simple three horse straight load (standard nose gooseneck) horse trailer. The top rail units, bottom rail units, intermediate side posts, rear corner side posts, drop side posts, nose corner side posts, upper cross members, at least some of the lower cross members and other parts of the trailer can also be extruded out of aluminum if desired.

The alternative embodiment of the inventive slat unit, slat unit 110, can be substituted for the slat unit 40 in the inventive livestock trailer 160 if desired. Due to the structure of its middle leg members, the interior surface of the slat unit 110 is often easier to clean than the interior surface of the slat unit 40. This can be advantageous in connection with trailers that must be sanitized between loads, such as hog trailers and trailers for hauling diseased stock.

Figure 16:
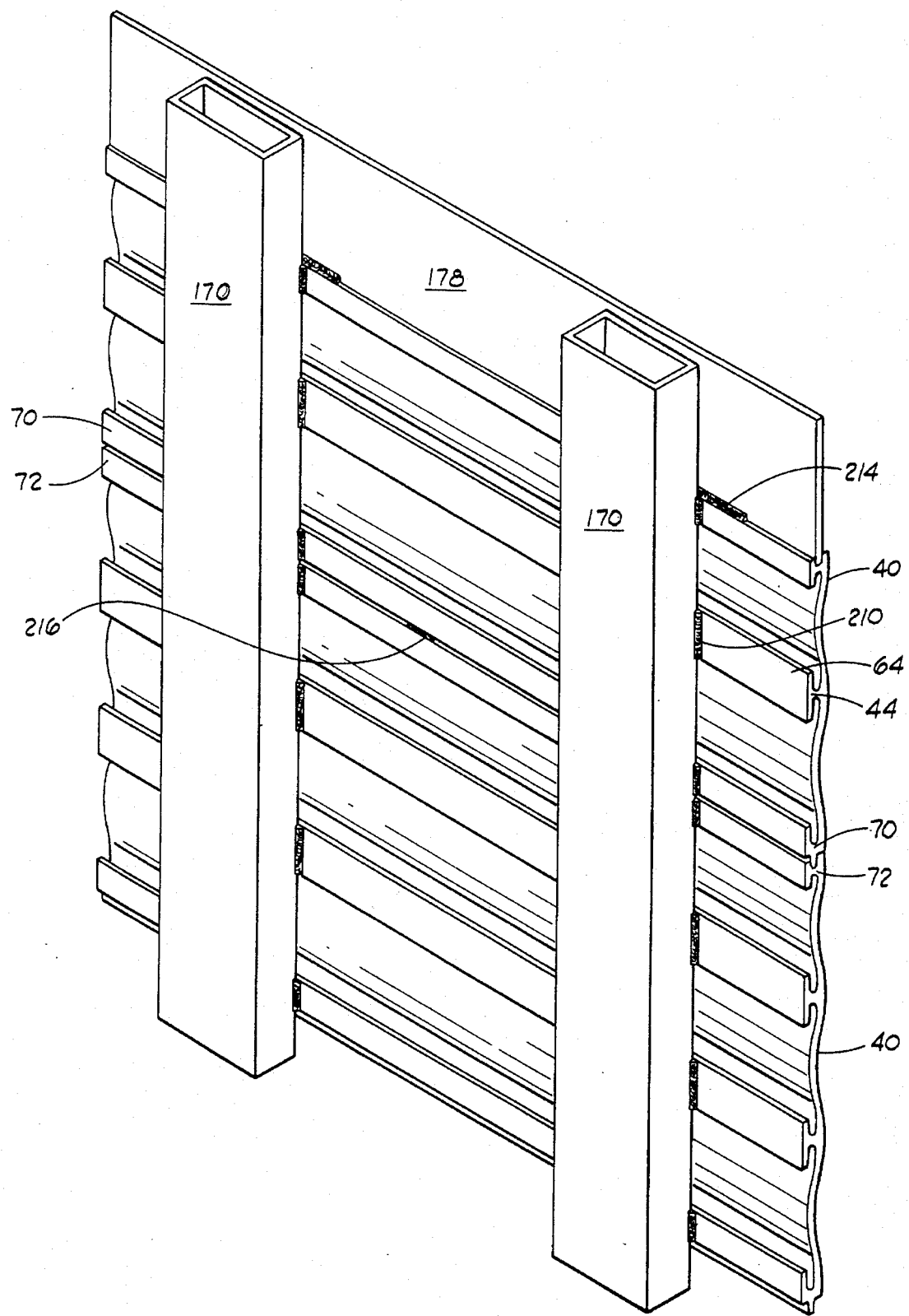
FIG. 16 is an enlarged side elevational view from the inside of the inventive trailer showing interior surfaces of inventive slat units (the embodiment shown by FIGS 4 and 5) as attached to side posts of the trailer and to each other.

Referring now to FIGS. 8 and 9 together with FIGS. 14–17, attachment of the inventive slat units 40 to side posts and other structure of the trailer and to each other is illustrated in detail. Each slat unit 40 is attached to an intermediate side post 170 or other side post of the trailer by welding the foot portions 64 of the middle leg member(s) 44, the first edge foot portion 74 of the first edge leg member 70 and the second edge foot portion 80 and heel portion 84 of the second edge leg member 72 of the slat unit to the side post at points 210 thereon. The tongues 78 of the first edge leg members 70 of the lowermost slat units 40 of each side assembly (slat units 40(a)) overlap the corresponding bottom rail unit 168 and can be welded thereto if desired. The bottom edges 184 of smooth skin units 178 of each side assembly are received by the grooves 86 of the second edge leg members 72 of the uppermost slat units 40 of each side assembly (slat units 40(f)). The heel portions 84 of the second edge leg members 72 of the slat units 40(f) can be welded to the interior surfaces 212 of the smooth skin units 178 at points 214 if desired. The tongues 78 of the first edge leg members 70 of portions 0f some of the other slat units 40 on each side assembly (specifically slat units 40(c)) overlap the corresponding wheel well post 187 of the wheel well 186 and can be welded thereto if desired. The remaining top and bottom edges of the slat units 40 of each side assembly are attached together as illustrated by FIG. 6. For example, the tongues 78 of the first edge leg members 70 of the slat units 40(f) are received by the grooves 86 of the second edge leg members 72 of the adjacent slat units, especially slat units 40(e). The tongues 78 are affixed in place in the corresponding grooves 86 by welding in the spaces 90 and 92 as illustrated by FIG. 6. As shown by FIG. 16, the first leg member 70 of one slat unit 40 is welded to the second edge leg member 72 of an adjacent slat unit 40 at a point 216 halfway between side posts 170 of the trailer.

The exterior surfaces 46 of portions the slat units 40 as attached to a side post 170 of the trailer 160 and hence an outside surface 220 of the trailer 160 is shown by FIG. 17.

Due to the structure of the slat units 40, no weld marks are visible on the exterior surfaces 46 of the slat units 40 and hence the outside surface 220 of the trailer 160.

The inventive slat units 110 attach to side posts and other structure of the trailer and to each in the same way. For example, in attaching a slat unit 110 to a side post 170 or other side posts of the trailer, the foot portions 130 of the middle leg member(s) 114 and the second edge foot portion 140 and heel portion 144 of the second edge leg member 136 are welded to the side posts. In attaching the slat units 110 to each other, the tongue 138 of the first edge leg member 134 of one slat unit 110 is received by the groove 146 of the second edge leg member 136 of an adjacent slat unit 110 to interlock the two units together. Due to the structure of the slat units 110, no weld marks Show up on the exterior surfaces 116 of the slat units.

All embodiments of the inventive slat unit have many advantages. For example, forming the slat units by extrusion is relatively inexpensive and allows the size of the slat units to be easily varied. Forming the slat units by extrusion also allows the units to be easily corrugated as shown in the drawings. The fact that the inventive slat unit is a one-piece unit allows it to be easily and readily welded to the side posts or other frame members of the trailer.

The unique structure of the inventive slat unit imparts many advantages to the unit. For example, the "T" shaped structure of the middle leg members 44 of the slat unit 40 is particularly advantageous in that it allows the open spaces 66 to have a uniform width. The uniform width makes the spaces more effective at dissipating heat generated during the welding process. The "T" shaped structure also provides a greater surface area for welding the slat unit 40 to the side posts or other frame members of the trailer, increases the structural integrity of the leg members and the slat unit and makes the slat unit relatively easy to extrude.

Thus, the slat unit and trailer of the present invention are well adapted to carry out the objects and attain the ends and advantages mentioned as well as those inherent therein. While numerous changes in the arrangement and construction of parts will suggest themselves to those skilled in the art, such changes are encompassed within the scope of this invention as defined by the appended claims.

What is claimed is:

1. A livestock trailer comprising:

first side assembly including a first side post, a second side post and at least one slat unit inter-connecting said first and second side posts of said first side assembly and forming a side wall of said trailer;

a second side assembly including a first side post, a second side post and at last one slat unit inter-connecting said first and second side posts of said second side assembly and forming a side wall of said trailer, each of said slat units of said first and second side assemblies being extruded as a one-piece unit out of metal and including:

an elongated body portion having an exterior surface, an interior surface, a first edge, a second edge, a first end and a second end, said interior surface having a series of alternating longitudinally extending furrows and longitudinally extending ridges therein; and at least one leg member connected to and longitudinally extending along said interior surface of said body portion between said first and second ends thereof and positioned on said interior surface of said body portion between said first end second edge thereof, said leg member having a foot portion attached to said first and second side posts of one of said first and second side assemblies, said foot portion being spaced from said interior surface of said body portion such that an open space is provided therebetween for dissipating heat generated from attaching said foot portion to said side posts; and at least one cross member connecting said first side assembly and said second side assembly together.

2. The livestock trailer of claim 1, wherein each of said slat units is extruded out of an aluminum alloy.

3. The livestock trailer of claim 1, wherein said foot portion of said leg member of each of said slat units is spaced from said interior surface of said body portion such that said open space is provided between the foot portion and a furrow in said interior surface of said body portion.

4. The livestock trailer of claim 1, wherein said leg member of each of said slat units has a pair of foot portions extending in opposite directions, each of said foot portions being attached to said first and second side posts of one of said first and second side assemblies and being spaced from said interior surface of said body portion such that an open space is provided therebetween for dissipating heat generated from attaching the foot portion to said side posts.

5. The livestock trailer of claim 4, wherein each foot portion of said leg member of each of said slat units is spaced from said interior surface of said body portion such that said open space is provided between the foot portion and a furrow in said interior surface of said body portion.

6. The livestock trailer of claim 4, wherein each slat unit of said first and second side assemblies further comprises:

a first edge leg member connected to and longitudinally extending along said interior surface of said body portion between said first and second ends thereof and positioned on said interior surface adjacent said first edge of said body portion, said first edge leg member including:

a first edge foot portion extending toward said second edge of said body portion and attached to said first and second side posts of one of said first and second side assemblies, said first edge foot portion being spaced from said interior surface of said body portion such that an open space is provided therebetween for dissipating heat generated from attaching said first edge foot portion to said side posts; and a tongue extending away from said first and second edges of said body portion; and a second edge leg member connected to and longitudinally extending along said interior surface of said body portion between said first and second ends thereof and positioned on said interior surface adjacent said second edge of said body portion, said second edge leg member including:

a second edge foot portion extending toward said first edge of said body portion and attached to said first and second side posts of one of said first and second side assemblies, said second edge foot portion being spaced from said interior surface of said body portion such that an open space is provided therebetween for dissipating heat generated from attaching said second edge foot portion to said side posts; and a heel portion extending in an opposite direction from said second edge foot portion, said heel portion being spaced from said interior surface of said body portion such that a groove is provided therebetween.

7. A livestock trailer comprising:

a trailer body including:

a first side assembly including a first side post, a second side post and at least one slat unit interconnecting said first and second side posts of said first side assembler and forming a side wall of said trailer body:

a second side assembly including a first side post, a second side post and at least one slat unit interconnecting said first and second side posts of said second side assembly and forming a side wall of said trailer body, each of said slat units of said first and second side assemblies being extruded as a one-piece unit out of metal and including:

an elongated body portion having an exterior surface, an interior surface, a first edge, a second edge, a first end and a second end, said interior surface said body portion of each of said slat having a series of alternating longitudinally extending furrows and longitudinally extending ridges therein; and at least one leg member connected to and longitudinally extending along said interior surface of said body portion between said first and second ends thereof and positioned on said interior surface of said body portion between said first and second edges thereof, said leg member having a foot portion attached to said first and second side posts of one of said first and second side assemblies, said foot portion being spaced from said interior surface said body portion such that an open space is provided therebetween for dissipating heat generated from attaching said foot portion to said side posts; and at least one cross member connecting said first side assembly and said second side assembly together;

a wheel assembly connected to said trailer body; and coupler means connected to said trailer body for attaching said trailer to a vehicle.

8. The livestock trailer of claim 7, wherein said foot portion of said leg member of each of said slat units is spaced from said interior surface of said body portion such that said open space is provided between the foot portion and a furrow in said interior surface of said body portion.

9. A livestock trailer comprising:

a first side assembly including a first side post, a second side post and at least one slat unit interconnecting said first and second side posts of said first side assembly said forming a side wall of said trailer;

a second side assembly including a first side post, a second side post and at least one slat unit interconnecting said first and second side posts of said second side assembly and forming a side wall of said trailer, each of said slat units of said first and second side assemblies being extruded as a one-piece unit out of metal and including:

an elongated body portion having an exterior surface, an interior surface, a first edge, a second edge, first end and a second end, said interior surface having a series of alternating longitudinally extending indentations and longitudinally extending ridges therein; and at least one leg member connected to and longitudinally extending along said interior surface of said body portion between said first and second ends thereof and positioned on said interior surface of said body portion between said first and second edges thereof, said leg member having a foot portion attached to said first and second side posts of one of said first and second side assemblies, said foot portion being spaced from said interior surface of said body portion such that an open space is provided therebetween for dissipating heat generated from attaching said foot portion to said side posts;

an underlying frame connecting said first side assembly and said second side assembly together;

a wheel assembly connected to said underlying frame: and coupler means connected to said underlying frame for attaching said trailer to a vehicle.

10. The livestock trailer of claim 9, wherein said foot portion of said leg member of each of said slat units is spaced from said interior surface of said body portion such that said open space is provided between the foot portion and an indentation in said interior surface of said body portion.

11. The livestock trailer of claim 9, wherein said leg member of each of said slat units has a pair of foot portions extending in opposite directions, each of said foot portions being attached to said first and second side posts of one of said first and second side assemblies and being spaced from said interior surface of said body portion such that an open space is provided therebetween for dissipating heat generated from attaching the foot portion to said side posts.

12. The livestock trailer of claim 11, wherein each foot portion of said leg member of each of said slat units is spaced from said interior surface of said body portion such that said open space is provided between the foot portion and an indentation in said interior surface of said body portion.

13. The livestock trailer of claim 11, wherein each slat unit of said first and second side assemblies further comprises:

a first edge leg member connected to and longitudinally extending along said interior surface of said body portion between said first and second ends thereof and positioned on said interior surface adjacent said first edge of said body portion, said first edge leg member including:

a first edge foot portion extending toward said second edge of said body portion and attached to said first and second side posts of one of said first and second side assemblies, said first edge foot portion being spaced from said interior surface of said body portion such that an open space is provided therebetween for dissipating heat generated from attaching said first edge foot portion to said side posts; and a tongue extending away from said first and second edges of said body portion; and a second edge leg member connected to and longitudinally extending along said interior surface of said body portion between said first and second ends thereof and positioned on said interior surface adjacent said second edge of said body portion, said second edge leg member including:

a second edge foot portion extending toward said first edge of said body portion and attached to said first and second side posts of one of said first and second side assemblies, said second edge foot portion being spaced from said interior surface of said body portion such that an open space is provided therebetween for dissipating heat generated from attaching said second edge foot portion to said side posts; and a heel portion extending in an opposite direction from said second edge foot portion, said heel portion being spaced from said interior surface of said body portion such that a groove is provided therebetween.

14. An improved livestock trailer of the type including a first side assembly, a second side assembly, a plurality of cross members connecting the first and second side assemblies together, a wheel assembly and a coupler unit for attaching the trailer to a vehicle, wherein the first and second side assemblies each include a first side post, a second side post and at least one slat unit interconnecting the first and second side posts of the corresponding side assembly and forming a side wall of the trailer, the improvement wherein each of said slat units is extruded as a one-piece unit out of metal and comprises:

an elongated body portion having an exterior surface, an interior surface, a first, edge, a second edge, a first end and a second end, said interior surface having a series of alternating longitudinally extending furrows and longitudinally extending ridges therein; and at least one leg member connected to and longitudinally extending along said interior surface of said body portion between said firs and second end thereof and positioned on said interior surface of said body portion between said first and second edges thereof, said leg member having a foot portion attached to said first and second side posts of one of said first and second side assemblies, said foot portion being spaced from said interior surface of said body portion such that an open space is provided therebetween for dissipating heat generated from attaching said foot portion to said side posts.

15. The livestock trailer of claim 14, wherein said foot portion of said leg member of each of said slat units is spaced from said interior surface of said body portion such that said open space is provided between the foot portion and a furrow in said interior surface of said body portion.

16. The livestock trailer of claim 14, wherein said leg member of each of said slat units has a pair of foot portions extending in opposite directions, each of said foot portions being attached to said first and second side posts of one of said first and second side assemblies and being spaced from said interior surface of said body portion such that an open space is provided therebetween for dissipating heat generated from attaching the foot portion to said side posts.

17. The livestock trailer of claim 16, wherein each foot portion of said leg member of each of said slat units is spaced from said interior surface of said body portion such that said open space is provided between the foot portion and a furrow in said interior surface of said body portion.

18. The livestock trailer of claim 16, wherein each slat unit of said first and second side assemblies further comprises:

a first edge leg member connected to and longitudinally extending along said interior surface of said body portion between said first and second ends thereof and positioned on said interior surface adjacent said first edge of said body portion, said first edge leg member including:

a first edge foot portion extending toward said second edge of said body portion and attached to said first and second side posts of one of said first and second side assemblies, said first edge foot portion being spaced from said interior surface of said body portion such that an open space is provided therebetween for dissipating heat generated from attaching said first edge foot portion to said side posts; and a tongue extending away from said first and second edges of said body portion; and a second edge leg member connected to and longitudinally extending along said interior surface of said body portion between said first and second ends thereof and positioned on said interior surface adjacent said second edge of said body portion, said second edge leg member including:

a second edge foot portion extending toward said first edge of said body portion and attached to said first and second side posts of one of said first and second side assemblies, said second edge foot portion being spaced from said interior surface of said body portion such that an open space is provided therebetween for dissipating heat generated from attaching said second edge foot portion to said side posts; and a heel portion extending in an opposite direction from said second edge foot portion, said heel portion being spaced from said interior surface of said body portion such that a groove is provided therebetween.

19. The livestock trailer of claim 7, wherein each of said slat units is extruded out of an aluminum alloy.

20. The livestock trailer of claim 7, wherein said leg member of each of said slat units has a pair of foot portions extending in opposite directions, each of said foot portions being attached to said first and second side posts of one of said first and second side assemblies and being spaced from said interior surface of said body portion such that an open space is provided therebetween for dissipating heat generated from attaching the foot portion to said side posts.

21. The trailer of claim 20, wherein each foot portion of said leg member of each of said slat units is spaced from said interior surface of said body portion such that said open space is provided between the foot portion and a furrow in said interior surface of said body portion.

22. The trailer of claim 7, wherein each slat unit of said first and second side assemblies further comprises:

a first edge leg member connected to and longitudinally extending along said interior surface of said body portion between said first and second ends thereof and positioned on said interior surface adjacent said first edge of said body portion, said first edge leg member including:

a first edge foot portion extending toward said second edge of said body portion and attached to said first and second side posts of one of said first and second side assemblies, said first edge foot portion being spaced from said interior surface of said body portion such that an open space is provided therebetween for dissipating heat generated from attaching said first edge foot portion to said side posts; and a tongue extending away from said first and second edges of said body portion; and a second edge leg member connected to and longitudinally extending along said interior surface of said body portion between said first and second ends thereof and positioned on said interior surface adjacent said second edge of said body portion, said second edge leg member including:

a second edge foot portion extending toward said first edge of said body portion and attached to said first and second side posts of one of said first and second side assemblies, said second edge foot portion being spaced from said interior surface of said body portion such that an open space is provided therebetween for dissipating heat generated from attaching said second edge foot portion to said side posts; and a heel portion extending in an opposite direction from said second edge foot portion, said heel portion being spaced from said interior surface of said body portion such that a groove is provided therebetween.

23. A livestock trailer comprising:
a trailer body including:
- a first side assembly including a top rail unit, a bottom rail unit, a plurality of side posts connecting said top rail unit and said bottom rail unit of said first side assembly together and at least one metal slat unit welded to said side posts of said first side assembly and forming a side wall of said trailer;
- a second side assembly including a top rail unit, a bottom rail unit, a plurality of side posts connecting said top rail unit and said bottom rail unit of said second side assembly together and at least one metal slat unit welded to said side posts of said second side assembly and forming a side wall of said trailer, each of said slat units of said first and second side assemblies being an extruded, one-piece unit and including:
    - an elongated, corrugated body portion having an exterior surface, an interior surface, a first edge, a second edge, a first end and a second end, said exterior surface and said interior surface each including a series of alternating longitudinally extending indentations and longitudinally extending ridges therein; and
    - at least one leg member connected to and longitudinally extending along said interior surface of said body portion from said first end to said second end thereof and positioned on said interior surface of said body portion between said first and second edges thereof, said leg member having a pair of foot portions extending in opposite directions, each of said foot portions being welded to a side post of one of said first and second side assemblies and being spaced from said interior surface of said body portion such that an open space is provided between the foot portion and said interior surface for dissipating heat generated from welding the foot portion to said side post;
- a plurality of upper cross members connecting said top rail units of said first and second side assemblies together;
- a roof unit attached to at least one of said upper cross members;
- a plurality of lower cross members connecting said bottom rail units of said first and second side assemblies together; and
- a floor unit attached to at least one of said lower cross members;
a wheel assembly connected to said trailer body; and
coupler means connected to said trailer body for attaching said trailer to a vehicle.

24. The livestock trailer of claim 23 wherein each foot portion of said leg member of each of said slat units is spaced from said interior surface of said body portion such that said open space is provided between the foot portion and an indentation in said interior surface of said body portion.

25. The livestock trailer of claim 23 wherein each slat unit of said first and second side assemblies further comprises:
- a first edge leg member connected to and longitudinally extending along said interior surface of said body portion between said first and second ends thereof and positioned on said interior surface adjacent said first edge of said body portion, said first edge leg member including:
    - a first edge foot portion extending toward said second edge of said body portion and welded to a side post of one of said first and second side assemblies, said first edge foot portion being spaced from said interior surface of said body portion such that an open space is provided therebetween for dissipating heat generated from welding said first edge foot portion to said side post; and
    - a tongue extending away from said first and second edges of said body portion; and
- a second edge leg member connected to and longitudinally extending along said interior surface of said body portion between said first and second ends thereof and positioned on said interior surface adjacent said second edge of said body portion, said second edge leg member including:
    - a second edge foot portion extending toward said first edge of said body portion and welded to a side post of one of said first and second side assemblies, said second edge foot portion being spaced from Said interior surface of said body portion such that an open space is provided therebetween for dissipating heat generated from welding said second edge foot portion to said side post; and
    - a heel portion extending in an opposite direction from said second edge foot portion, said heel portion being spaced from said interior surface of said body portion such that a groove is provided therebetween.

26. The livestock trailer of claim 25 wherein each of said first and second side assemblies includes a plurality of slat units, the groove of the second edge leg member of one of said slat units receiving the tongue of the first edge leg member of another of said slat units.

27. The livestock trailer of claim 26 wherein said tongue is positioned in said groove such that a space is provided between said first edge foot portion of said first, edge leg member and said heel portion of said second edge leg member for welding the two slat units together.

* * * * *

UNITED STATES PATENT AND TRADEMARK OFFICE
CERTIFICATE OF CORRECTION

Patent No.: 5,613,726

Dated: March 25, 1997

Inventor(s): Kenneth E. Hobbs, Kenneth R. Waller, Larry A. O'Pecko and Mike H. Collie, Jr.

It is certified that errors appear in the above-identified patent and that said Letters Patent is hereby corrected as shown below:

Column 11, line 67, delete "end" and substitute --and-- therefor and delete "edge" and substitute --edges-- therefor;

Column 13, line 4, delete "assembler" and substitute --assembly-- therefor;

Column 13, line 16, delete "said body portion of each of said slat";

Column 13, line 56, insert --a-- between "edge," and "first";

Column 15, line 13, delete the comma between "first" and "edge,"; and

UNITED STATES PATENT AND TRADEMARK OFFICE
CERTIFICATE OF CORRECTION

PATENT NO. : 5,613,726

DATED : March 25, 1997

INVENTOR(S) : Kenneth E. Hobbs, Kenneth R. Waller, Larry A. O'Pecko and Mike H. Collie, Jr.

It is certified that error appears in the above-indentified patent and that said Letters Patent is hereby corrected as shown below:

```
Column 15, line 19, delete "firs" and
substitute --first-- therefor and delete "end"
and substitute --ends-- therefor.
```

Signed and Sealed this

Twenty-fourth Day of June, 1997

Attest:

Attesting Officer

BRUCE LEHMAN

Commissioner of Patents and Trademarks